United States Patent
Eliasson

(10) Patent No.: US 8,636,293 B2
(45) Date of Patent: Jan. 28, 2014

(54) HUMAN POWERED COMMUTER VEHICLE

(75) Inventor: Jonas Eliasson, Valby (DK)

(73) Assignee: Me-Mover ApS, Rodovre (DK)

( * ) Notice: Subject to any disclaimer, the term of this patent is extended or adjusted under 35 U.S.C. 154(b) by 43 days.

(21) Appl. No.: 13/322,345

(22) PCT Filed: May 28, 2010

(86) PCT No.: PCT/DK2010/000072
§ 371 (c)(1),
(2), (4) Date: Nov. 23, 2011

(87) PCT Pub. No.: WO2010/136038
PCT Pub. Date: Dec. 2, 2010

(65) Prior Publication Data
US 2012/0068433 A1    Mar. 22, 2012

(30) Foreign Application Priority Data
May 28, 2009    (DK) .................................. 2009 00670

(51) Int. Cl.
*B62K 15/00*    (2006.01)
(52) U.S. Cl.
USPC ........................... 280/278; 280/282; 280/221
(58) Field of Classification Search
USPC .................... 280/278, 287, 282, 221
See application file for complete search history.

(56) References Cited

U.S. PATENT DOCUMENTS

| 3,485,509 | A | * | 12/1969 | Searle | 280/243 |
|---|---|---|---|---|---|
| 4,087,108 | A | * | 5/1978 | Winchell | 280/221 |
| 6,273,442 | B1 | | 8/2001 | Fallon et al. | |
| D453,198 | S | | 1/2002 | Dudley | |
| 6,402,173 | B1 | | 6/2002 | Chiu | |
| 6,457,544 | B1 | * | 10/2002 | Sung | 180/220 |
| 6,575,486 | B2 | * | 6/2003 | Ma | 280/287 |
| 6,716,141 | B2 | | 4/2004 | Bhoopathy | |
| 6,935,649 | B2 | * | 8/2005 | Lim | 280/278 |
| 6,976,687 | B2 | | 12/2005 | Beleski, Jr. | |
| 7,100,929 | B2 | * | 9/2006 | Shapiro et al. | 280/282 |
| 7,377,532 | B2 | | 5/2008 | Bauce | |
| 7,487,987 | B2 | | 2/2009 | Yan | |
| 8,226,104 | B2 | * | 7/2012 | Kulikov et al. | 280/287 |

FOREIGN PATENT DOCUMENTS

| DE | 29715152 U1 | 11/1997 |
|---|---|---|
| EP | 1950126 A1 | 7/2008 |
| FR | 2822794 A1 | 10/2002 |
| FR | 2915454 | 10/2008 |
| GB | 2232131 A | 12/1990 |
| GB | 2453796 A | 4/2009 |
| WO | WO 98/46474 A2 | 10/1998 |
| WO | WO 2004/045943 A1 | 6/2004 |
| WO | WO 2004/093595 A1 | 11/2004 |
| WO | WO 2006/009958 A2 | 1/2006 |
| WO | WO 2008/101502 A1 | 8/2008 |

* cited by examiner

*Primary Examiner* — Kevin Hurley
(74) *Attorney, Agent, or Firm* — Muncy, Geissler, Olds & Lowe, PLLC

(57) ABSTRACT

This invention relates to a foldable vehicle comprising at least three wheels which of one wheel is a steering wheel, a steering handle, a frame connected with the steering element and having at least one standing surface. Upon folding the frame will be movable with respect to the steering handle to statically fit together in a compact manner Hereby a practical and efficient vehicle for personal transportation and commuting is created.

13 Claims, 12 Drawing Sheets

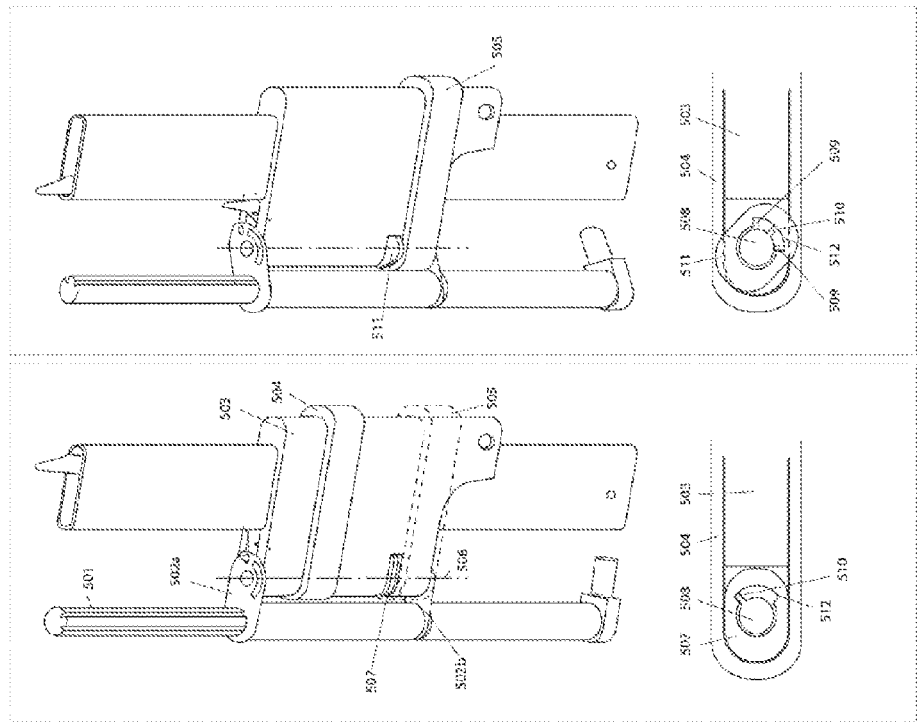
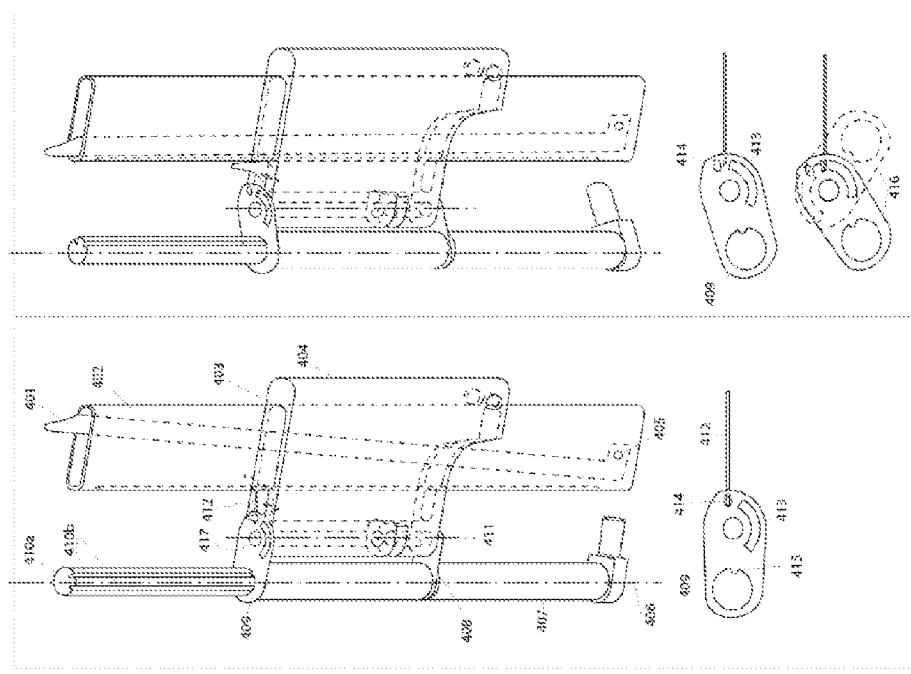

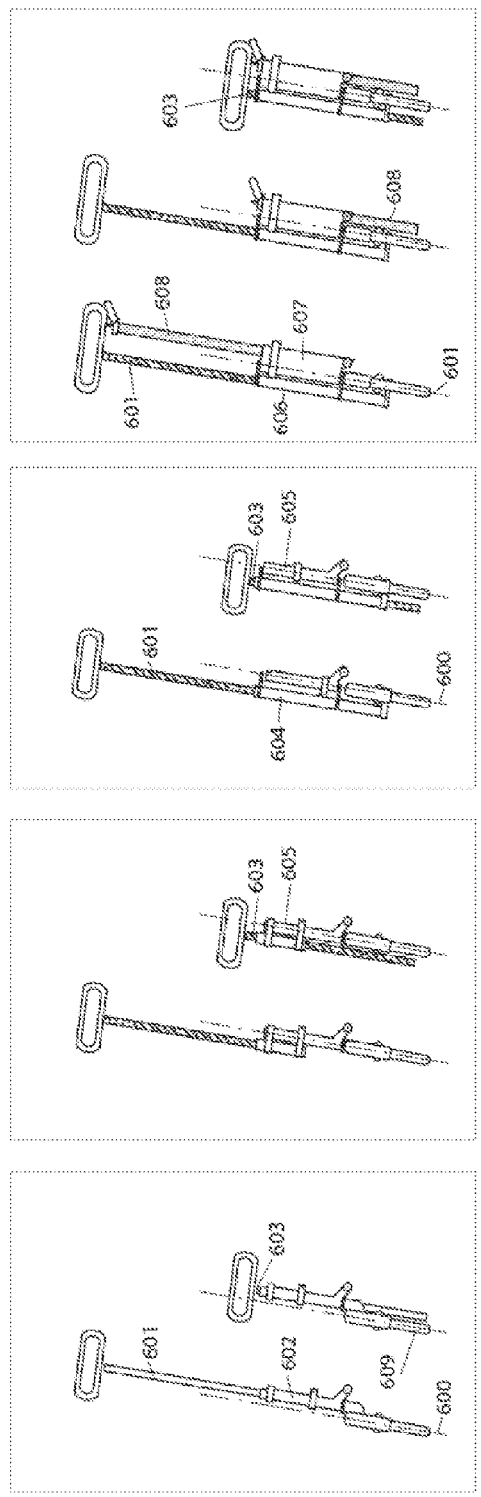
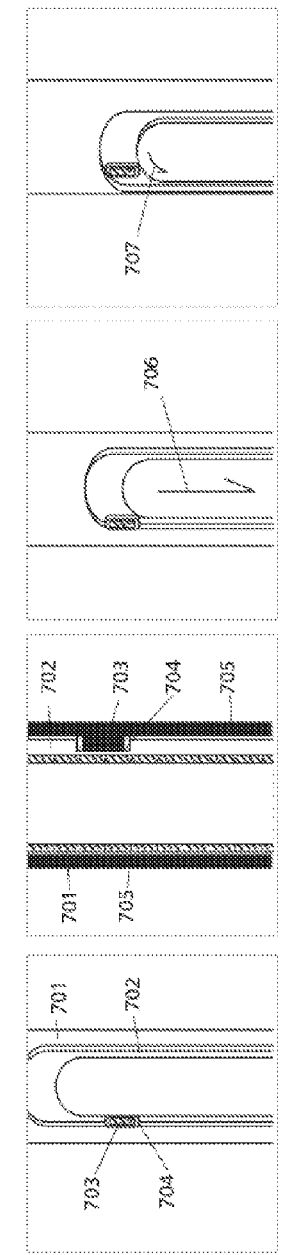
figure 6
figure 7

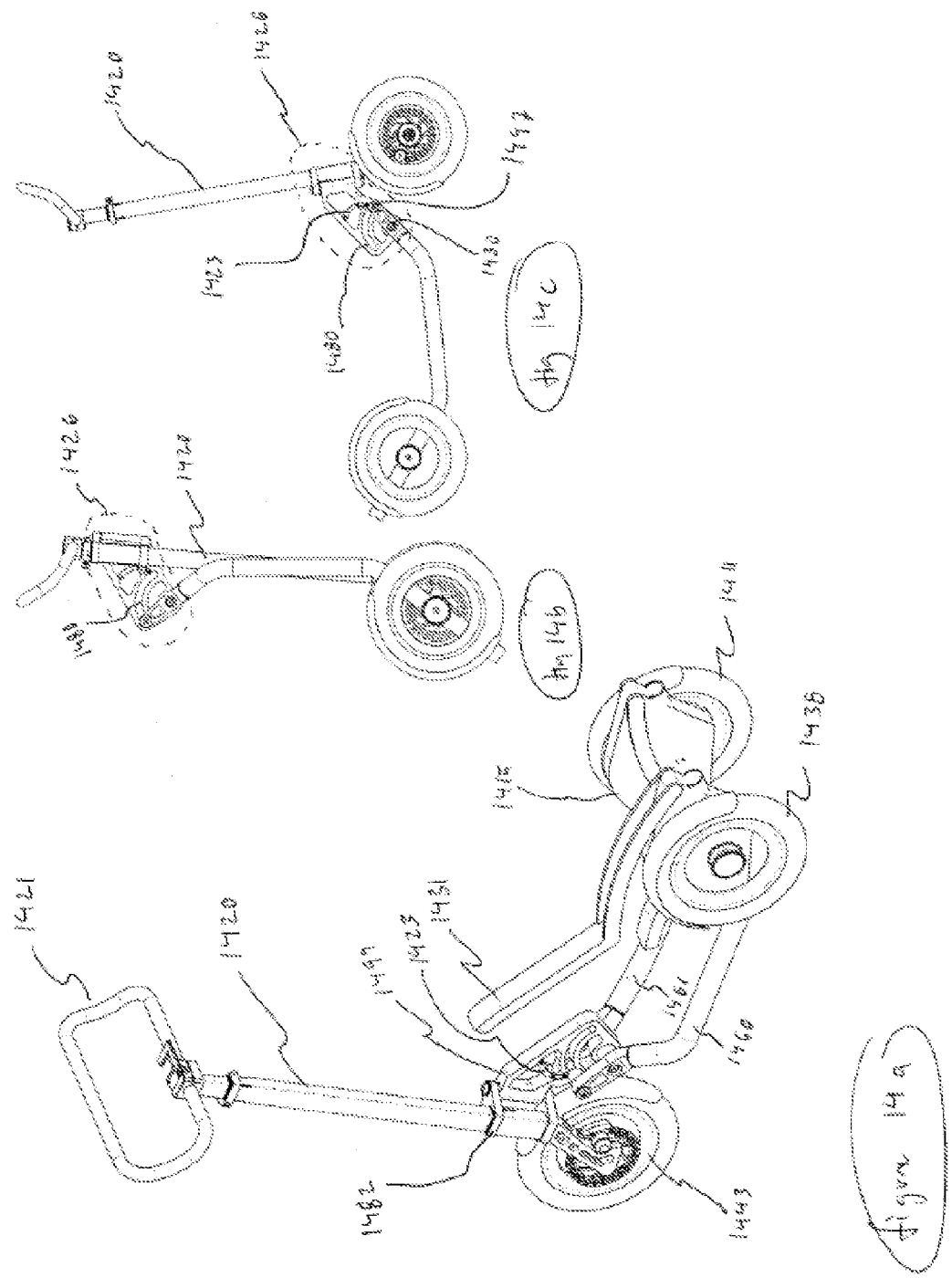

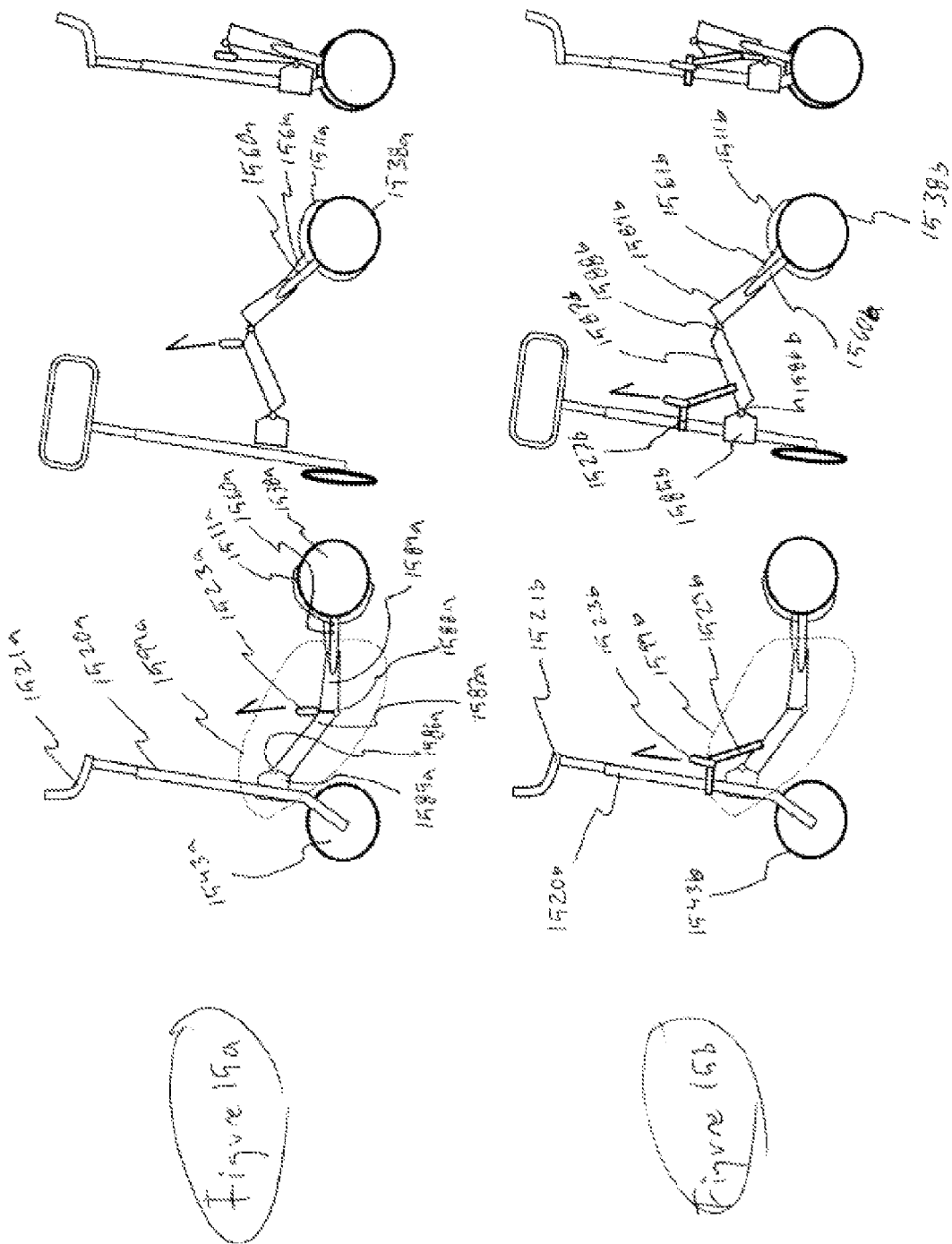

HUMAN POWERED COMMUTER VEHICLE

FIELD OF THE INVENTION

The present invention relates to the field of foldable multi-wheeled vehicles, in particular vehicles that are easily folded into a compact structure such as a hand carry or trolley for storage or transportation, and unfolded for normal operation. More specifically, the invention relates to a structural design of such a vehicle and corresponding methods of operating the same.

BACKGROUND OF THE INVENTION

Effective personal transportation is a major keystone to sustainable development of our cities. While mass transit is the most resource efficient way to transport people, there is a need for adequate transport from the passengers' home and work and to the transit point. To solve this issue a vehicle is desired by which the passenger can transport him/herself to the transit point and bring the vehicle onboard the mass transit means in order to use it after getting off the same to reach the final destination. No existing solution can solve this issue in a suitable way.

Patent application PCT/EP2004/004198 discloses a "trolley type container, convertible into a scooter" describing vehicle folding into a trolley. The vehicle is three wheeled and propelled by the user pushing one foot on the ground while standing on the vehicle. Such a solution can be practical; however the propulsion system is inadequate for efficient transport, even in modest speeds the vehicle will be hard to control when turning due to the rigid construction of the same.

U.S. Pat. No. 6,273,442 "Folding two wheeled vehicle" discloses a two wheeled vehicle foldable into a bag that can be dragged as a trolley. However the folding operation of the vehicle requires a multiple of operations while handling multiple potentially dirty parts, making the folding process complicated and cumbersome. Further the volume of the rigid main structure makes it hard to ride, and impairs the balance. The size of the vehicle makes it improper for use in combination with most means of public transport.

Patent application no WO2008DK00076 "Vehicle for carrying a standing person" discloses a three wheeled human powered vehicle. the vehicle is powered by operating a pair of pedals. However the vehicle has a complicated pedal/transmission structure which makes it limited in use. Further the vehicle is not possible to fold into a compact form and thus not possible to bring in most means of public transportation.

OBJECT AND SUMMARY OF THE INVENTION

It is an object of the invention to provide a method (and corresponding device) that alleviates at least to an extent the abovementioned problems.

Another object is to create a vehicle for personal transport that can be propelled manually in bicycle speeds, while having safe and intuitive driving abilities.

A further objective is to create a vehicle for personal transportation that is light, compact and can be produced in high volumes to a low price.

A further objective is to create a transmission system that is effective, maintenance free, light and intuitive to operate.

A further objective is to create a vehicle that fast and easy fold in a manner that makes it suitable to take on public transportation, such as buses and trains.

A further objective is to create a vehicle suitable for efficient and ergonomic exercising.

A further objective is to create a vehicle for play, leisure and cruising.

A further objective is to create a vehicle that lets the driver travel in good comfort, protecting the driver from road dirt and liquids and lets the driver bring luggage on the vehicle in a safe and protected way.

This is achieved by a foldable vehicle comprising at least three wheels, of which at least one wheel is a front wheel, a steering handle connected to the front wheel through a steering column assembly a front frame assembly connected with the steering post and at least two wheel arm assemblies, rotably connected to the front frame assembly, said vehicle further comprising at least one standing surface, characterized in that the vehicle is adapted to fold in a way that the rear wheels can be moved and statically fitted in a compact manner together with the front wheel(s).

In this way, a practical and efficient vehicle for personal transportation and commuting is created.

In one embodiment of a foldable vehicle, the vehicle folds in such a way that the folded structure can be moved rolling on the rear wheels making it easy to transport while folded.

In one embodiment of a foldable vehicle, the steering handle is located in an opposite end of the folded vehicle than the rear wheels. So that the structure functions as a trolley, the steering handle acts as handle for the user, and the rear wheels acts as trolley wheels allowing the vehicle to roll on the same, making the vehicle easy to transport when folded, and enables a simple construction the same.

In one embodiment of a foldable vehicle, when in folded position all wheels are located in the same end of the structure, positioned in a substantially parallel direction in line with the elongation of the vehicle, allowing it to fold in a compact manner.

In one embodiment of a foldable vehicle, a front frame assembly is rotably connected to the steering post in a axis substantially in line with the same allowing the steering wheel to be turned by a user in order to navigate the vehicle.

At least a portion of the front frame assembly is moveable in a direction towards the steering handle by active manipulation of the user, and causing the vehicle to fold. In this way the vehicle can be folded in a simple and intuitive manner.

In one embodiment of a foldable vehicle at least a portion of the front frame assembly is able to move in line with the steering post in order to fold and unfold the vehicle.

In one embodiment of the foldable vehicle the whole front frame assembly can be moved along an axis in line with the steering post in order to fold and unfold the vehicle. Thus is enabled a simple and cost efficient design of the vehicle.

In one embodiment of a foldable vehicle at least a portion of the front frame assembly is released and possible to move in relation to the steering handle by releasing a dedicated locking mechanism. Securing that folding only occurs when desired.

In one embodiment of a foldable vehicle, the vehicle can be folded after unlocking the folding mechanism by turning the steering handle to a specific angle or angle span. Thus is created an intuitive and simple unlocking mechanism.

In one embodiment of a foldable vehicle, the vehicle can be folded after unlocking the folding mechanism by turning the steering handle to a specific angle or angle span and releasing at least one dedicated locking mechanism. Thus is created an intuitive and secure unlocking mechanism.

In one embodiment of a foldable vehicle the folded structure has at least one protruding edge above and behind the rear wheel axes, positioned in such a way that the folded structure can be moved to an upright standing position and while being supported by the protruding edge maintain the position with no other support. In this way a method of easily handling the folded vehicle even in situations when one needs to let go of the handle.

In one embodiment of a foldable vehicle the front wheel has a dislocated position with respect to a centre line (A) of the steering post. In this way the steering post can be positioned in between the wheel arm assemblies when folded and without conflicting with the front frame assembly, further the steering post can when folded be depressed to a downward point where its lower part is in line with the lowest part of the front wheel without colliding with said wheel.

In one embodiment of a foldable vehicle a wheel arm joint is located between the wheel arm front section and the wheel arm rear section configured to lock wheel arm front section and the wheel arm rear section when unfolded.

In this way the wheel arm front section and the wheel arm rear section can be securely and locked joined to one stiff wheel arm connecting the front frame part to the rear wheels in a controlled manner.

In one embodiment of a foldable vehicle the wheel arm joint houses a spring loaded tap movable into an aperture.

In this way a simple yet effective and secure locking mechanism is achieved.

In one embodiment of a foldable vehicle the spring loaded tap is movable by applying a twisting force to the steering handle.

In this way the wheel arm front section and the wheel arm rear section can be released in relation to each other to be folded. The twisting force applied to the steering handle facilitates the folding procedure being simple clean and effective.

In one embodiment of a foldable vehicle a fold lock handle is a locking mean connected to the front frame part located in line with the front frame part.

In this way the fold lock handle can be simply, securely and efficiently implemented. The fold lock handle can further manipulate mechanisms both located on the top of the compartment and in the front frame part.

In one embodiment of a foldable vehicle the fold lock handle is configured to lock both the front wheel and the folded frame in relation to the steering handle.

In this way, a simple and intuitive locking operation is achieved.

In one embodiment of a foldable vehicle a compartment is mounted on the front part of said vehicle, said compartment having at least one open side wherein at least a part of the folded vehicle structure can fit.

In this way the compartment can protect potentially dirty and or protruding parts from harming the user or others when folded.

In one embodiment of a foldable vehicle the compartment is moveable along the steering post and configured to cover at least a main part of the folded frame.

In this way, the vehicle can in a simple manner be folded to an enclosed package with no protruding or dirty parts exposed, making it ideal for bringing in for example mass transit means.

In one embodiment of a foldable vehicle the folding of the vehicle is performed by moving the compartment upwards in parallel to the steering post.

In this way, a simple and fast folding operation is achieved where the user do not need to touch any potentially dirty parts.

In one embodiment of a foldable vehicle at least two wheels f the folded frame are fully or partly located outside the compartment.

In this way, the folded vehicle can be used as a trolley which can be easily dragged by a user, utilising the wheels as trolley wheels.

In one embodiment of a foldable vehicle, at least two wheel arm assemblies are connected to the front frame assembly in such a way that the vehicle can lean while all wheels are connected to the ground and being substantially in line with each other, apart from the steering wheel when turned.

In one embodiment of a foldable vehicle, the wheel arm assemblies are connected with a cambering joint to the front frame assembly. The cambering joint allowing the wheel arms to rotate in a defined and limited manner in relation to the front frame part, while enabling the vehicle to tilt in relation to the ground while all wheels are connected to the ground, and the angle between the steering post and a theoretical line, the combined wheel arm line, placed in between the two wheel arm assemblies, remains substantially constant. Thus it is making the driving safe and intuitive.

In one embodiment the cambering joint has at least one rod, connecting the wheel arms and the front frame assembly, said rod is connected to the wheel arms and front frame assembly by means of a flexible component such as an elastomer or a spring, coil etc. capable of transferring forces and allowing different part to rotate, move and twist to a certain degree in relation to each other. When the vehicle tilts, the rod tilts correspondingly, transferring forces from one wheel arm to the other and maintaining the angle between the steering post and the combined wheel arm line in a defined manner. The flexible component connecting the said rod to the wheel arm assemblies and the front frame assembly allows forces to be transported from the rod while allowing the rod to rotate and move in relation to the said parts. In such a way a simple, robust and economic cambering joint is created.

In one embodiment the cambering joint includes several different types of flexible materials with different properties. This allows fine-tuning of the cambering joint performance.

In one embodiment of the cambering joint a flexible material are placed in a part made of non flexible material which is in turn inserted or mounted to the wheel arms and or front frame assembly. Thereby it is possible to make the assembly of the vehicle simpler.

In one embodiment of the cambering joint the non flexible part in which flexible material is inserted, is mounted in the wheel arm assemblies or and the front frame assembly in such a way that it can rotate and move in defined directions while still maintaining the desired cambering functionality. Thereby it is possible to connect the cambering joint directly to for instance a wheel arm tube with minimal machining and assembly time.

In one embodiment of the cambering joint flexible material is mounted in between the wheel arm assemblies in a way that said material is manipulated when the vehicle moves, and that said material react to this manipulation with a reacting force aiming to restore the normal position of the vehicle. Thus a simple and efficient mechanism for maintaining the vehicle in upright position when not operated is created.

In one embodiment of the cambering joint flexible material is mounted in between the wheel arm assemblies and the front frame assembly, said material functioning as a mechanism for maintaining the upright position of the vehicle when not in use.

In one embodiment of the cambering joint, a first rod inserted in the front frame assembly and in the wheel arm assembly is mounted in a curved elongated slot while the other rod is mounted in a conventional hole. The elongated slot is formed in such a way that the first rod can move inside the slot when the user folds or unfolds the vehicle. Thus the cambering joint is part of the folding mechanism and forms an economic and safe solution.

In one embodiment of the folding cambering mechanism, the positioning of the first and second rod in relation to wheel assemblies and front frame assembly, as well as the shape of the curved elongated slot is made in such a way that when the vehicle is nearly unfolded, and a force is put on a wheel arm assembly in front of the rear wheel axle, the vehicle is forced to fully unfold, and the first rod moves to the dedicated unfold position in the curved elongated slot. Thus the vehicle will in a safe manner always obtain the correct unfolded structure.

In one embodiment of the folding cambering mechanism the first rod inserted in an elongated slot can be locked in a specific position such as when the vehicle is unfolded, or folded, with a dedicated camber rod locking mechanism.

In one embodiment of the camber rod locking mechanism, the rod is automatically locked when getting in unfolded position by means of a spring loaded part. Thus is created a safe and intuitive locking of the vehicle in unfolded position.

In one embodiment of a folding vehicle at least one wheel arm assembly is equipped with a pedal and a corresponding transmission system said pedal can be operated by the user in order to propel the vehicle forward. In this way an efficient and intuitive driving system is created.

In one embodiment of a folding vehicle each wheel arm assembly is equipped with an independent pedal and corresponding transmission system. Thus the vehicle can in a simple manner be propelled forward by a user engaging a dedicated pedal for each foot.

The embodiments of the device according to the present invention correspond to the embodiments of the method according to the present invention and have the same advantages for the same reasons. Advantageous embodiments of the device according to the present invention are defined in the sub-claims and described in detail in the following.

Further it is for those knowledgeable in the art of mechanics apparent that specific parts in the vehicle can be replaced with parts or assemblies of parts giving the same effect. Exemplified by but not limited to; the chain can be substituted by any flexible tensile element such as a wire, a belt etc. the lever-chain assembly can be replaced with an assembly of rigid parts, electro mechanical assemblies and alike, the pedal assembly can be replaced with any pedal or lever arrangement, the transmission can be shifted to another transmission or combination of transmissions of any suitable type, the folding mechanism locking, opening and moving parts can be interchanged with parts or assemblies giving same functionality be it in full or in part mechanical, hydraulic, pneumatic, electromechanical or other form.

BRIEF DESCRIPTION OF THE DRAWINGS

These and other aspects of the invention will be apparent from and elucidated with reference to the illustrative embodiments shown in the drawings, in which:

FIG. 14*b* and *c* are side views-folded and unfolded FIG. 15*a* and *b* schematically illustrates embodiments a foldable vehicle with different designs of a front frame assembly and corresponding folding methods.

DESCRIPTION OF PREFERRED EMBODIMENTS

All figures are nothing but schematic, simplified representations of possible solutions to the described function, and as such the figures and following description is meant to function as enabling embodiments not limiting the scope of the innovation.

Figure 1:
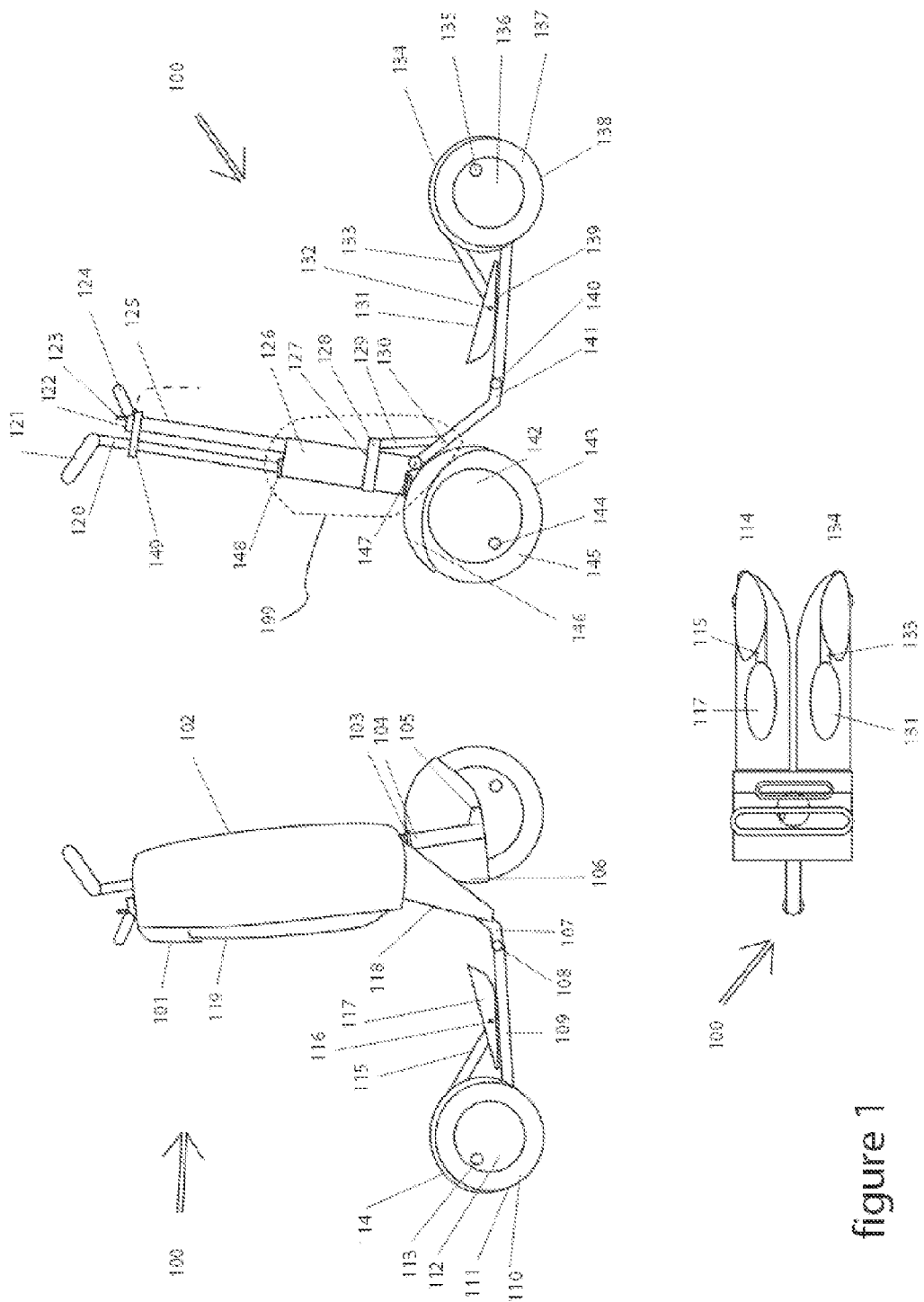
FIG. 1 schematically illustrates an embodiment of a foldable vehicle in side and top views FIG. 2 schematically illustrates an embodiment of a foldable vehicle operated by a user FIG. 3 *a, b, c, d, e, f, g* and *h* schematically illustrates an embodiment of the folding of a vehicle FIG. 4*a* and *b* schematically illustrates an embodiment of a part of a folding mechanism FIG. 5*a* and *b* schematically illustrates an embodiment of part of a folding mechanism FIG. 6*a,b,c* and *d* schematically illustrates embodiments of variants of steering stem arrangements for a vehicle FIG. 7*a,b,c* and *d* schematically illustrates embodiments of part of a steering stem mechanism FIG. 8*a,b* and *c* schematically illustrates embodiments of part of a folding mechanism FIG. 9*a,b,c* and *d* schematically illustrates an embodiment of a cambering mechanism FIG. 10*a,b,c,d,e,f* schematically illustrates embodiments of variants of pedal arrangements for a vehicle FIG. 11*a,b,c,d,e,f* schematically illustrates embodiments of part of locking mechanism for steering stem FIG. 12*a* and *b* schematically illustrates embodiments of variants of transmission and gearing mechanism FIG. 13*a* and *b* schematically illustrates embodiments of variants of user interface mechanisms FIG. 14*a* schematically illustrates an embodiment of a foldable vehicle in a 3d view.

FIG. 1 schematically illustrates a preferred embodiment of a unfolded foldable vehicle 100 as compromising a front frame part 126, a steering handle 121 a steering post 120, a lower steering post part 104, a steering post joint 148 a lower steering part joint 103, a front wheel fastening part 105 a front wheel 143, a left 138 and a right 111 rear wheel, a left 141 and a right 107 wheel arm front section, a wheel arm/front frame joint 147 a left 139 and right 109 rear wheel arm section, a left 140 and right 108 wheel arm joint, a left 131,132,133 and right pedal 115,116,117 assembly, a dirt screen 118 a compartment 102, a compartment post 125 a compartment handle 124 and a fold lock handle 123, a folding main bracket 126, a folding arm 129, a cambering joint 130, left 140 and right 108 wheel arm joint a storage compartment 101,119, a front wheel light 144, a left 135 and a right rear wheel light 113, and wheel fenders 146,134,114.

In unfolded position as in FIG. 1 the steering handle 121 is rigidly connected to the lower steering post part 104. The lower steering post part 104 is rotably connected to the front wheel 143 through the front wheel fastening part 105. The steering post 120 and front wheel assembly 143,104,105 are rotably connected to the front frame part 126 through the steering post joint 148 and the lower steering post joint 103 in such a way that the assembly can rotate in an axis in line with a vertical centre axis of the front wheel. The front wheel fender 146 is rigidly fastened to the lower steering post part 104. The compartment 102 and compartment handle 124 are rigidly connected to the compartment post 125 which in turn is rigidly inserted in the front frame part 126. The left wheel arm front section 141 and rear section 139 are rigidly connected through the left wheel arm joint 140, the left rear wheel 138 is rotably connected to the left wheel arm rear section 139 creating a left wheel arm assembly. The right wheel arm parts 107,108,109 and rear wheel 111 is correspondingly making a right wheel arm assembly. The left and left wheel arm assemblies are rotably connected to the front frame part 126 in the wheel arm/front frame joint 147. The left and rear wheel arm assemblies are further connected to the folding arm 129 through a cambering joint 139, said assemblies are in turn is rigidly connected to the front frame part 126 through the main folding bracket 127. The cambering joint 130 is a semi rigid joint that allows the left and right wheel arm assemblies to move in a determined way as to let the vehicle lean in relation to the ground while maintaining the front frame parts vertical angle in relation to the mean axis of the left and right wheel arm assemblies and maintain ground contact for all three wheels 143, 138, 111. The right and left wheel assemblies are formed in such a way that they protect the rider from dirt and liquids from the road. The fold lock handle 123 is used to in conjunction with a designated turning of the steering handle and movement of the compartment handle 124 to unlock manifold rigid connections and to fold the vehicle. The wheel fenders 146,134,114 protect the rider, the vehicle and environment from dirt and water distributed by the spinning wheels 143, 138, 111. The rear wheel fenders 134, 114 house the transmission of the vehicle. The pedals 117, 131 can each be operated on its own or simultaneously by the driver in order to propel the vehicle forward; additionally the pedals 134, 114 can each be manipulated in a certain way to activate brakes and change gears. The compartment 102 combined with the dirt screen 118 functions as dirt and water protection for the user. Integrated in the compartment 102 is an enclosable storage compartment 119 with a lid 101.

Figure 2:
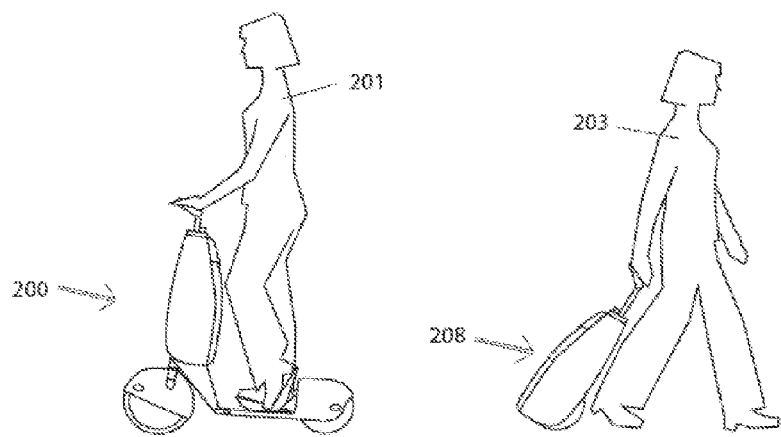

In FIGS. 2a and 2b is schematically illustrated the foldable vehicle in unfolded vehicle mode 200 operated by a driver 201, and in folded trolley mode 202 dragged by a walking person 203.

In FIGS. 3a to 3h is schematically illustrated the process of folding the vehicle to a compartment or a trolley. The vehicle compromises a steering handle 308, a fold-lock handle 309, a compartment handle 310, a compartment post 311, a folding arm 312, a left wheel arm front section 313a, a right wheel arm front section 313b, a left rear wheel 314, a left wheel arm rear section 315a, a right wheel arm rear section 315b, a front wheel 316, a folding main bracket 317, a front frame part 318, and a compartment 319.

Figure 3:
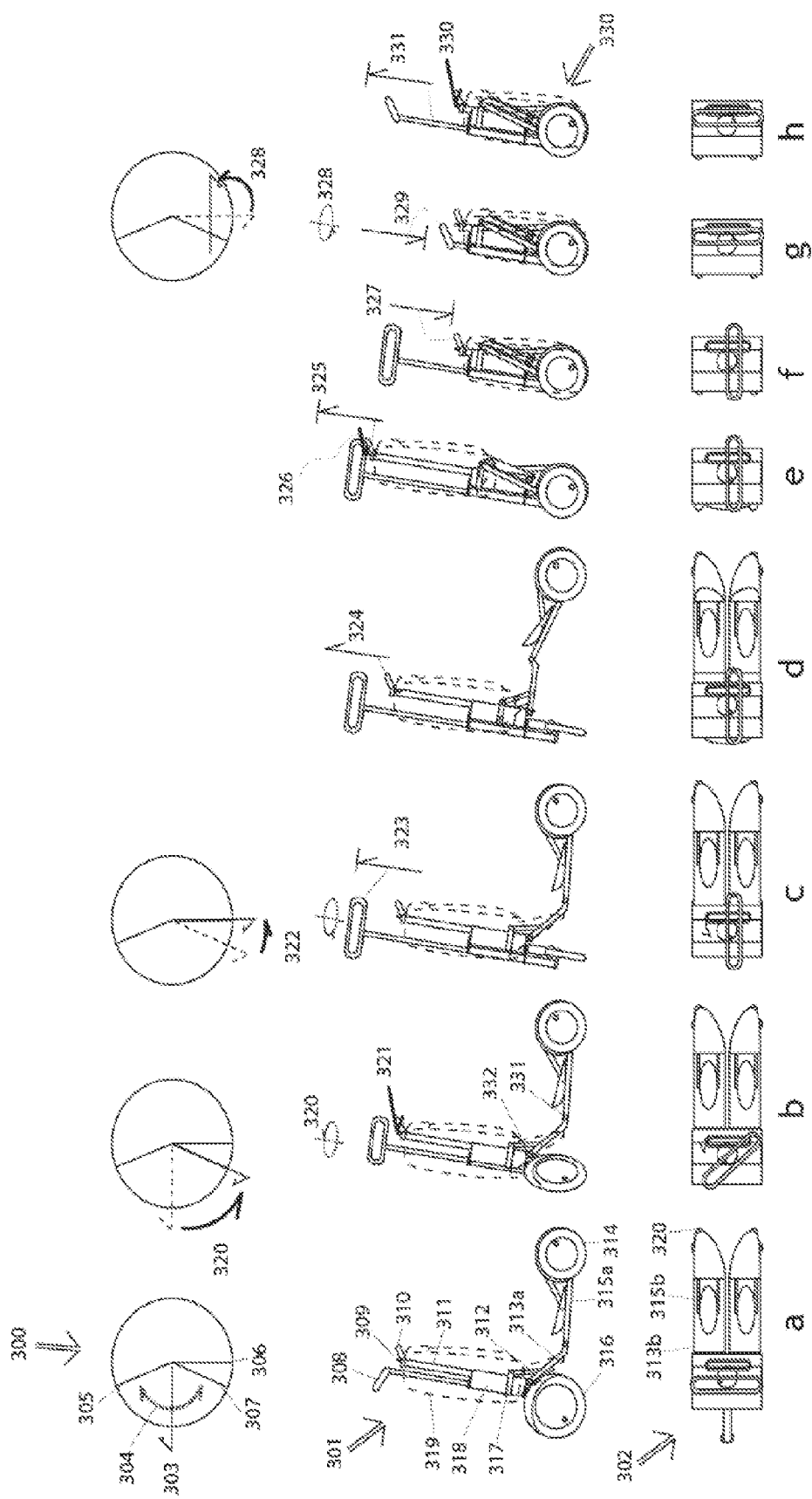

In FIG. 3a is illustrated the vehicle in unfolded position 301 above is illustrated in a diagram of steering angles 300 illustrating a vector 303 perpendicular to the steering handle seen from above. The clockwise max angle 305, counter clockwise max angle 307, and fold unlock angle 306 is illustrated, below is a top view of the vehicle 302.

Further, FIG. 3b illustrates the first step to fold the vehicle. A first rotation of steering handle around steering post joint axis 320 turns the front wheel 316 to a counter clockwise max angle 307, a first press of fold-lock handle 321 releases the steering handle 308 for height adjustment.

In FIG. 3c a first lift movement of steering handle 323 lifts the steering handle 308 to a top position. A second rotation of steering handle around steering post joint axis 322 to a fold unlock angle 306 unlocks the folding mechanism and locks the steering handle 308 in a top position. The folding mechanisms of the vehicle is now unlocked. The main folding bracket 317 becomes unlocked in relation to a radial movement relative to the front frame part 318, the left and right wheel arm joints 331 are unlocked making the left and right wheel arm assemblies possible to bend in said joint The compartment 319 is now possible to move upwards in a direction parallel to the frame front part 318.

Further in FIG. 3d a lift of compartment handle 324 moves the compartment 319, the compartment post 311 and the main folding bracket 317 upwards. The folding arm 312 is connected rotably to the main folding bracket 317 and is moved upwards making the left and right wheel arm assembly bend in the left and right wheel arm joints 331 in such a way that the right 313b and left 313a wheel arm front section rotate upwards around the wheel arm/front frame joint 332.

In FIG. 3e a continued lift of compartment handle 325 moves the compartment 319 and compartment handle 310 to a top position. The wheel arm assemblies are fully folded. With a second press of fold-lock handle to top position 326 the compartment 319 can be pushed downwards without changing the state of the wheel arm assemblies. 3f. A first down press of compartment to bottom position 327 moves the compartment 319 to a position where it substantially covers the front frame part 318, front wheel 316 and wheel assemblies etc. When the compartment 319 is pushed downwards to an end position the compartment 319 and compartment handle 310 becomes locked in position in relation to the front frame part.

In FIG. 3g a down press movement of steering handle to bottom position 329 moves the steering handle to a downward end position. It is now possible to turn the steering post and steering handle 90 degrees counter clockwise in relation to the lower steering post part to a trolley angle 328.

FIG. 3f illustrates how a third press of fold-lock handle 330 and a second lift of steering handle to trolley position 331 makes the vehicle fully folded and in trolley mode 330. The rear wheels 314 and 320 are functioning as trolley wheels making it possible to drag the trolley with low effort forward. By reversing the process, the vehicle can be unfolded.

FIGS. 4a and 4b schematically illustrates a mechanism compromising a fold-lock handle 401, a compartment post 402, a profile for compartment post 403, a front frame part 404, a fastening axis for fold lock handle 405, a centre axis for steering post 406, a lower steering post part 407, a lower steering post joint 408, a steering post joint 409, a steering post 410a, a steering post profile 410b, a steering post joint axis 411, a steering angle limitation part 412a, a steering angle limitation part axis 412b, a steering angle limitation matrix 413, a steering angle locking matrix 414, a steering post joint steering bracket 415.

The steering post 410 is mounted into the lower steering post part 407 both are connected rotably around the steering post joint axis to the front frame part 404 through a steering post joint 409 and a lower steering post joint 408. The steering post joint 409 is formed as to include a steering angle limitation matrix 413, a steering angle locking matrix 414 and a steering post joint steering bracket. The steering post joint steering bracket fixes the steering post rotationally in relation to the lower steering post part 407. The steering angle locking matrix 414 and steering angle limitation matrix 413 works in conjunction with a steering angle limitation part 412.

In FIG. 4a the steering angle limitation part 412 is interacting with the steering angle locking matrix 414 the steering post 410a and lower steering post part 407 is fixed in regards to rotation around the steering post joint axis 411.

Further FIG. 4b illustrates the steering angle limitation part 412 moved around the limitation part bolt 417 by the fold-lock handle 401 and no longer interacts with the steering angle locking matrix 414. The steering post 410a is turned around the steering post joint axis 411. When the fold-lock handle 401 is released the steering angle limitation part 412 will swivel back around the limitation part bolt 417 and interact with the steering angle limitation matrix 413. Thus, the steering post 410 will be limited to rotate around the steering post joint axis 411 between the maximum possible steering angles 416.

FIGS. 5a and 5b schematically illustrates a mechanism compromising a steering post 501, a steering post joint 502a, a lower steering post part 502b, a front frame part 503, a folding main bracket 504, 505 a steering post joint axis 506, a folding main bracket lock part 507, 511, a steering posit joint rod 508, a steering post joint rod profile 510.

FIG. 5a; the folding mechanism is open. The folding main bracket lock part is in unlocked position 507 it is held in the position by the steering post 501 position in relation steering post joint axis 506 and the corresponding position of the steering post joint rod profile 510 which interacts with the lock part matrix 512. The main folding bracket is in unlocked position 504 and able to move in a direction parallel to the front frame part 503. The steering post 501 is locked in regards to rotation around the steering post joint axis 506.

Further FIG. 5b illustrates how the main folding bracket 505 has been moved downward to a bottom position, and the steering has been turned clockwise to a maximum clockwise position 509 thus turning the main bracket lock part 511 to locked position. The folding mechanism is locked. The steering post 501 is able to rotate in a limited angle span around the steering post joint axis 506 without affecting the main bracket lock part.

FIG. 6a, 6b, 6d schematically illustrates variants of steering stem arrangements for a vehicle compromising a wheel vertical axis 600, a steering post 601, a lower steering post 602, a lower steering post part a 604, a front frame post 605, a lower steering post part b 606, a front frame simple part 607, a compartment post 608, a front frame part 609. All variants have a steering post 601 mounted in parallel to and off axis to the wheel vertical axis 600. The steering post 601 is utilised to rotate the wheel in order to manoeuvre a vehicle. When depressed to a lowest point 603 the steering post 601 is moved in parallel the front wheel 611 without touching said wheel.

FIG. 6a; A simple assembly of a steering post 601, inserted in a lower steering post 602 both having a centre axis off line with the wheel vertical axis 600. The steering post assembly is hinged in the centre axis of the steering post 601 off line to the wheel vertical axis 600.

Further in FIG. 6b the steering post is connected to a front frame post 605 with a rotably rigid joint. The front frame post rotates in line with the wheel vertical axis 600.

In FIG. 6c the steering post 601 is rotably rigid inserted in the lower steering post part a 604, the latter is hinged to the front frame post 605 in an axis in line with the wheel vertical axis 600 and can rotate around the same.

Followed by illustration 6d where the steering post 601 is rotably rigid inserted in the lower steering post part b 606, the latter is hinged to the front frame part 607 in an axis in line with the wheel vertical axis 600 and can rotate around the same. Further a compartment post 608 is inserted in the front frame part 605 and can move in parallel to said part without interacting with the front wheel 609.

FIGS. 7a, 7b, 7d schematically illustrates a part of a steering stem mechanism compromising a steering post 701, a steering post profile 702, a steering lock bar 703, a steering lock bar fitting 704, a lower steering post part 705.

In FIG. 7a the steering post 701 has a steering post profile 702. Inserted in the profile is a steering lock bar 703 protruding from the lower steering post part 705, and fitted with a semi flexible steering lock bar fitting 704. The steering post 701 is rotably fixed to the lower steering post part 705 but able to move vertically in parallel to the lower steering post part.

FIG. 7b illustrates a schematic intersection of steering post 701, and lower steering post part.

Next, in FIG. 7c a first downward motion of steering post 706 moves the steering post 701 to a downward position. The steering post profile 702 is moved in relation to the steering lock bar 703 in such a way that the steering post 701 can be rotated 90 in a limited way in relation to the lower steering post part 705.

In the following FIG. 7d a first turning movement of steering post 707 rotates the steering post in relation to the lower steering post part 705 to a position where the steering post 701 can be lifted in relation to the lower steering post part and rotably fixed to said part while having an rotational angle to the lower steering post part 705 substantially different than in 7a.

Figure 8:
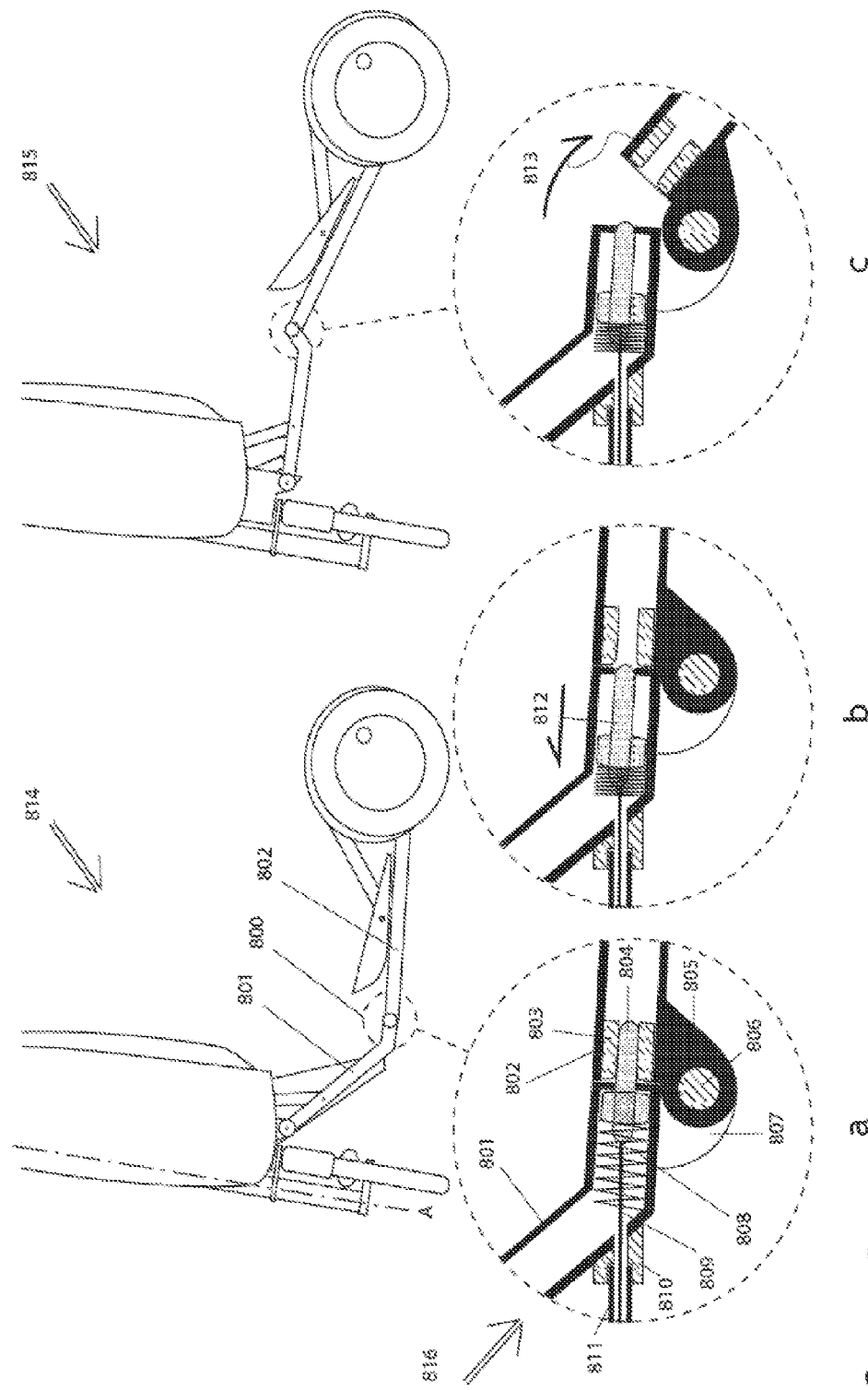

FIGS. 8a, 8b and 8c schematically illustrates a part of a folding mechanism compromising a wheel arm joint 800, a wheel arm front-section 801, a wheel arm rear-section 802, a wheel arm joint bolt socket 803, a wheel arm joint locking bolt 804, a wheel arm rear joint bracket 805, a wheel arm joint axis 806, a wheel arm front joint bracket 807, a wheel arm joint locking bolt spring 808, a wheel arm joint wire 809, a wheel arm joint wire mantle socket 810, a wheel arm joint wire mantle 811.

FIG. 8a schematically illustrates a vehicle in un folded mode 814, and an intersection 816 of a wheel arm joint 800. The wheel arm joint 800 is rigidly connecting the wheel arm front-section 801 and a wheel arm rear-section 802. A locking bolt 804 is inserted in a wheel arm joint bolt socket 803 and held in place by means of a wheel arm joint locking bolt spring 808.

Next in FIG. 8b the wheel arm joint wire 809 is retracted, for instance by applying a designated twisting force on the steering handle (not shown in drawings) and pulls the locking bolt 804 out of the wheel arm joint bolt socket 803 by a forward movement of locking bolt 812 while the wheel arm joint locking bolt spring 808 is loaded. The wheel arm joint 800 is unlocked.

Followed by FIG. 8c where the wheel arm front-section 801 is rotated around the wheel arm joint axis 806 with a bending movement wheel arm 813 and in relation to the longitudinal axis of the wheel arm rear-section 802. The vehicle 815 is in folded mode.

Figure 9:
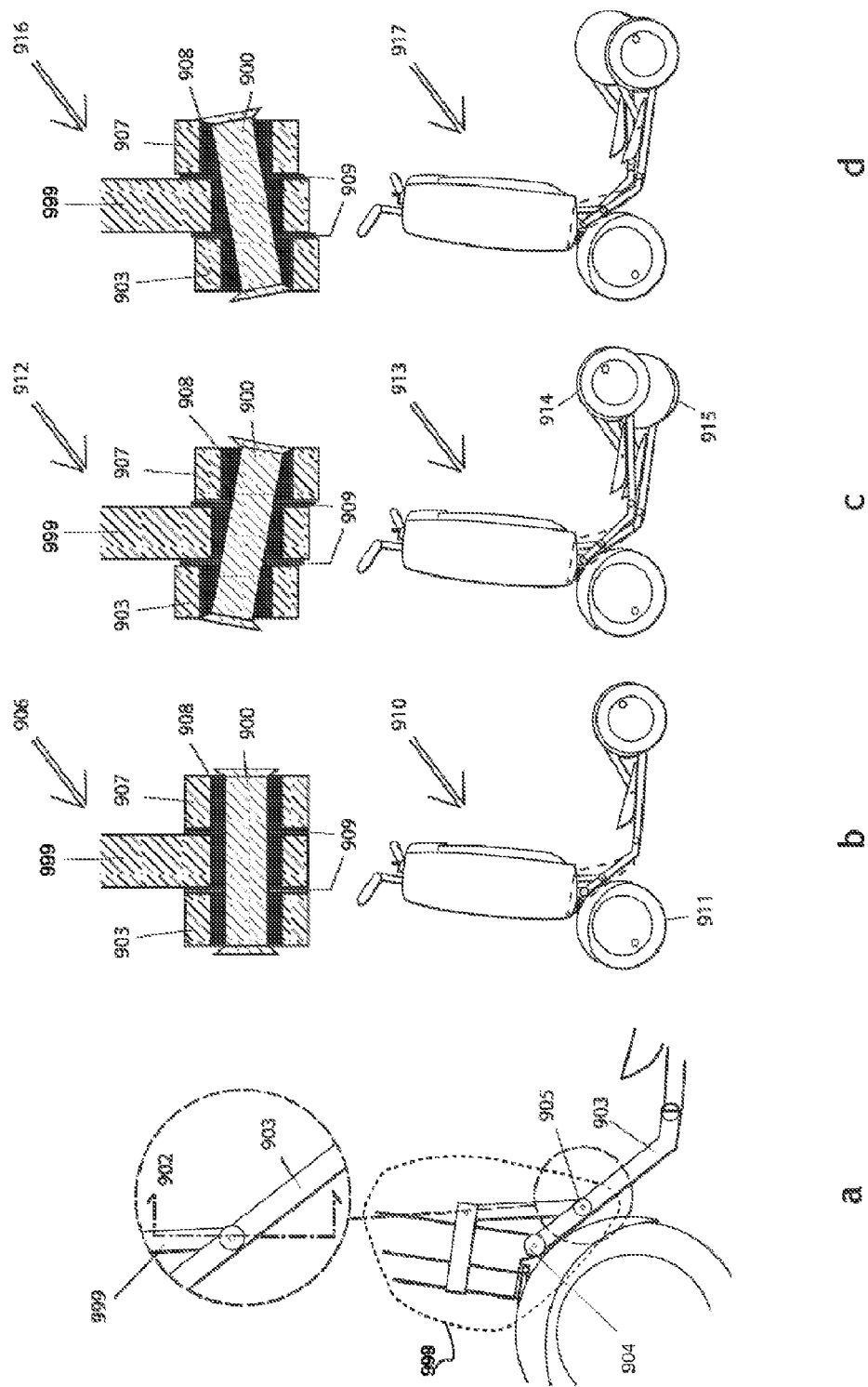

FIG. 9a,b,c and d schematically illustrates an embodiment of a cambering mechanism of a vehicle compromising a camber bolt 900, a front frame assembly 999 compromising a folding arm 901, further a left wheel arm front section 903, a wheel arm/front frame joint 904, a cambering joint 905, a right wheel arm front section 907, a flexible cambering bush 908, a cambering spacer disks 909, a front wheel 911, a left rear wheel 914, a right rear wheel 915, In FIG. 9a a vehicle in level position and close up of cambering joint 905 is shown. The left wheel arm front section 903 and right wheel arm front section 907 are rotably connected in a wheel arm/front frame joint 904 and semi-rigidly connected in cambering joint 905 to the front frame assembly 999.

Followed by FIG. 9b where the vehicle is in upright, level position 910, an intersection of cambering joint in level position 906. The cambering joint 905 joins a front frame assembly 999, a left wheel arm front section 903 and a right wheel arm front section 907 with a rigid camber bolt 900 mounted with a flexible cambering bush 908. The front frame assembly 999, a left wheel arm front section 903 and a right wheel arm front section 907 are separated from direct contact with cambering spacer disks 909.

In FIG. 9c is illustrated the vehicle leaning to the left 913, intersection of cambering joint: lean to left 912. The left wheel arm front section 903 is moved upwards in relation to the front frame assembly 999 simultaneously the right wheel arm front section 907 is moved downwards in relation to said front frame assembly 999. The flexible cambering bush 908 is asymmetrically deformed to allow the movement of said wheel arm assemblies and the rigid camber bolt 900. The flexible nature of the flexible cambering bush 908 creates a force when deformed that strives to retain the original form and hence to move the cambering joint 905 to a level position.

Finally in FIG. 9c the vehicle is leaning to the right 917, intersection of cambering joint: lean to left 916. the right wheel arm front section 903 is moved upwards in relation to the front frame assembly 999 simultaneously the left wheel arm front section 907 is moved downwards in relation to said front frame assembly 999. The flexible cambering bush 908 is asymmetrically deformed to allow the movement of said wheel arm assemblies and the rigid camber bolt 900. The flexible nature of the flexible cambering bush 908 creates a force when deformed that strives to retain the original form and hence to move the cambering joint 905 to a level position.

In second design of the cambering joint (not illustrated in drawings) at least one flexible part is inserted in between the front frame assembly 999 and the wheel arms 903 and 907 in the cambering joint 905. When the vehicle leans this flexible part is deformed in an asymmetrical way creating a strong force striving to retain the original form and hence to move said cambering joint to a level position.

In third design of the cambering joint (not illustrated in drawings) the central part of the flexible cambering bush 908 which is placed in a cavity in the front frame assembly 999, is replaced by a rigid part which is rotably mounted to the front frame assembly 999.

In fourth design (not illustrated in drawings) of cambering joint on single piece of flexible material is mounted in between the wheel arm assemblies 907 and 903. Said piece of flexible material can be mechanically or chemically attached to said wheel arms.

In fifth design (not illustrated in drawings) of cambering joint the cambering bush is made from several flexible parts. The different flexible parts can be made from different materials or combinations hereof in order to further tune the behaviour of the cambering joint.

In sixth design (not illustrated in drawings) of cambering joint the cambering bush parts inserted in the wheel arm assemblies 907 and 903, is replaced by a flexible part inserted in a rigid part which in turn is inserted in said wheel arm assemblies. The rigid part can be mounted either rigidly to the said wheel arm assemblies, or being able to move or and rotate to a certain degree in a cavity in the wheel arms 907 and 903 in a way that do not hamper the overall cambering functionality.

In another design (not illustrated in drawings) of cambering joint the flexible cambering bush 908 and the rigid camber bolt 900 is replaced by at least one structural element in a material such as a polymer, a composite material or alike that can provide the combined functionality of a rigid and flexible elements, while being lighter and or simpler to produce and or mount.

All above described variations of cambering joint designs can be combined in any way.

FIGS. 10a, 10b, 10c and 10d schematically illustrates embodiments of variants of pedals operated by a user and compromising a pedal arm 1000, a pedal 1001, a pedal arm joint 1002, a generic pedal joint 1004, a drivers foot 1007, a pedal spring 1008, a vehicle frame 1009, a "masai" pedal a 1010, a pedal slit 1012, a "masai" pedal b 1013, a integrated pedal 1014, a integrated pedal joint 1015, a top rotating pedal 1018, a sub rotating pedal 1019.

Figure 10:
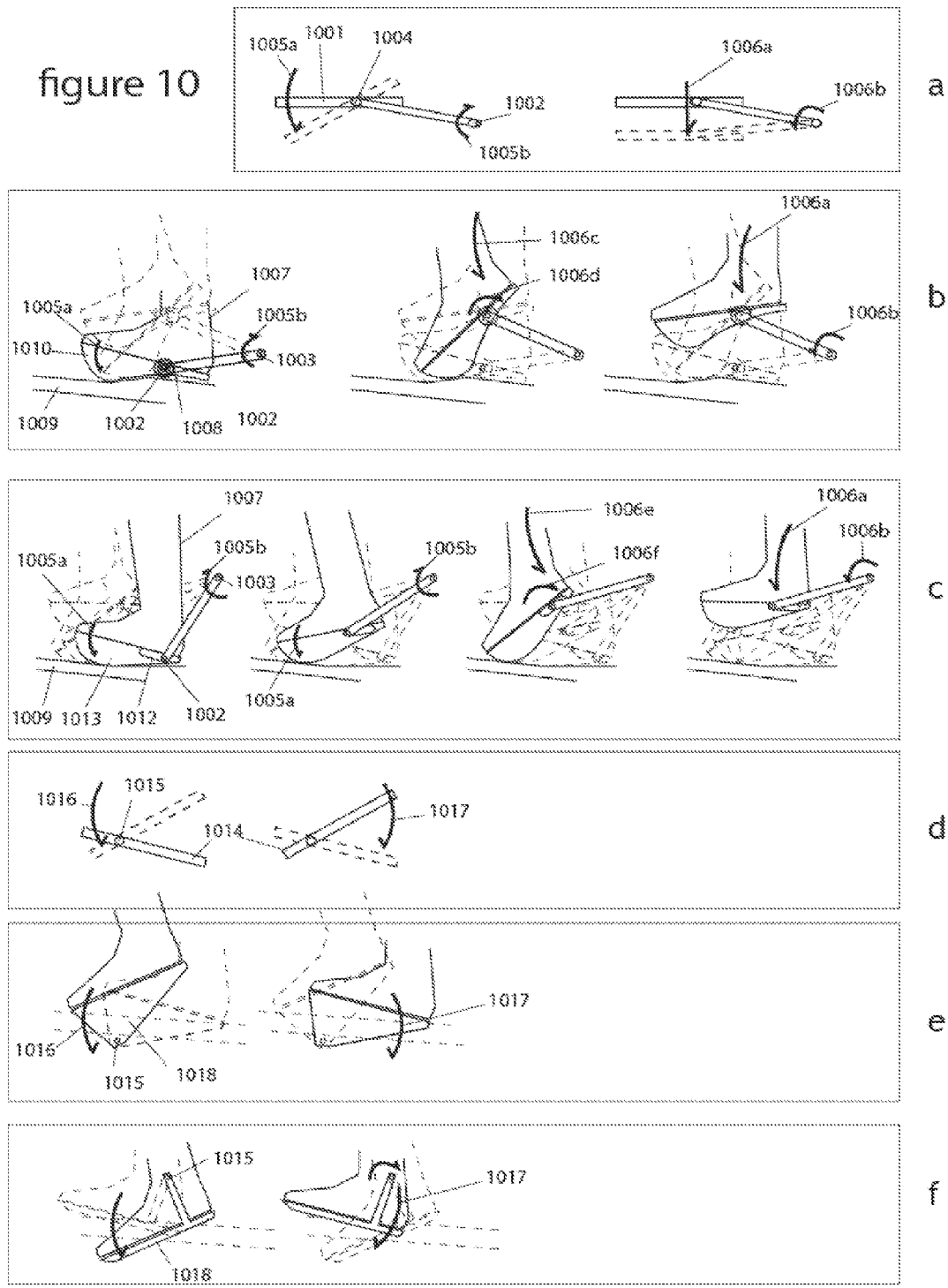

In FIG. 10a is schematically illustrated a generic pedal construction and mode of operation. When a front foot movement 1005a is applied the pedal 1001 is rotated forward around the generic pedal joint 1004 and the pedal arm 1000 is rotated upwards in a pedal arm first movement 1005b around the pedal joint 1002. When a downward pressure 1006a is applied to the pedal 1001 the pedal is moved downwards and the pedal arm moves in a second movement 1006b. the pedal arm 100 delivers the movement to a transmission means.

In FIG. 10b a "masai" pedal a 1010 is shown it is rotably connected to a pedal arm in a pedal arm joint 1003 and with a pedal spring 508. A front foot movement 1005a is applied to the "masai" a pedal 1010 rotating said pedal around the interaction point between said pedal and the vehicle frame 1009 and the pedal arm 1000 is rotated upwards in a pedal arm first movement. Thereafter a heel pressure 1006c is applied to the "masai" pedal a 1010, in conjunction with the pedal spring 1008 said pedal is turned to a substantially horizontal position. Thereafter a downward pressure 1006a is applied by the user making the "masai" pedal a 1010 move downwards, and the pedal arm move in a pedal arm second movement 1006b.

FIG. 10b illustrates a "masai" pedal b 1013 that is rotably connected to a pedal arm in a pedal arm joint 1003 in a pedal slit 1012 in such a way that the pedal arm joint 1003 can slide in a limited manner in a longitudinal direction relative to the "masai" pedal b 1013.

A front foot movement 1005a is applied to the "masai" b pedal 1013 rotating said pedal around the interaction point between said pedal and the vehicle frame 1009 and the pedal arm 1000 is rotated upwards in a pedal arm first movement. Thereafter a heel pressure 1006c is applied to the "masai" pedal b 1010 said pedal is turned to a substantially horizontal position and sliding backwards to a position where the pedal joint 1003 is meeting the forward limitation of the pedal slit 1012. Thereafter a downward pressure 1006a is applied by the user making the "masai" pedal b 1010 move downwards, and the pedal arm move in a pedal arm second movement 1006b. When the "masai" pedal b 1013 interacts with the vehicle frame 1009 said pedal rotates around the interaction point, prolonging the pedal arm second movement 1006b and forcing the pedal joint 1003 to slide backwards in the pedal slit 1012.

FIG. 10c schematically illustrates a generic integrated pedal construction and mode of operation. When a forward rocking movement 1016 is applied, the integrated pedal 1014 is rotated forward around the integrated pedal joint 1015. When a backward rocking movement 1017 applied to the pedal 1001 the integrated pedal 1014 is rotated backwards around the integrated pedal joint 1015. The pedal delivers movement directly to a transmission means.

In FIG. 10d, a top rotating pedal 1018 is operated as described in 10c. The specific feature of the top rotating pedal 1018 is that it has an integrated pedal joint 1015 positioned a substantial distance below the plane of the pedal.

In FIG. 10d, a sub rotating pedal 1019 is operated as described in 10c. The specific feature of the sub rotating pedal 1019 is that it has an integrated pedal joint 1015 positioned a substantial distance above the plane of the pedal.

FIGS. 11a-f schematically illustrates an embodiment of a part of a locking mechanism for steering post compromising a steering angle lock matrix plate 1101, a steering post 1102, a steering post assembly hinge 1103, a fold-lock handle 1104, a compartment handle 1105, a steering post height lock matrix plate 1106, a compartment post 1107, a steering handle 1108, a height lock part 1109, a steering angle lock profile 1110, a steering post height lock profile 1111, a fold lock handle profile 1112.

Figure 11:
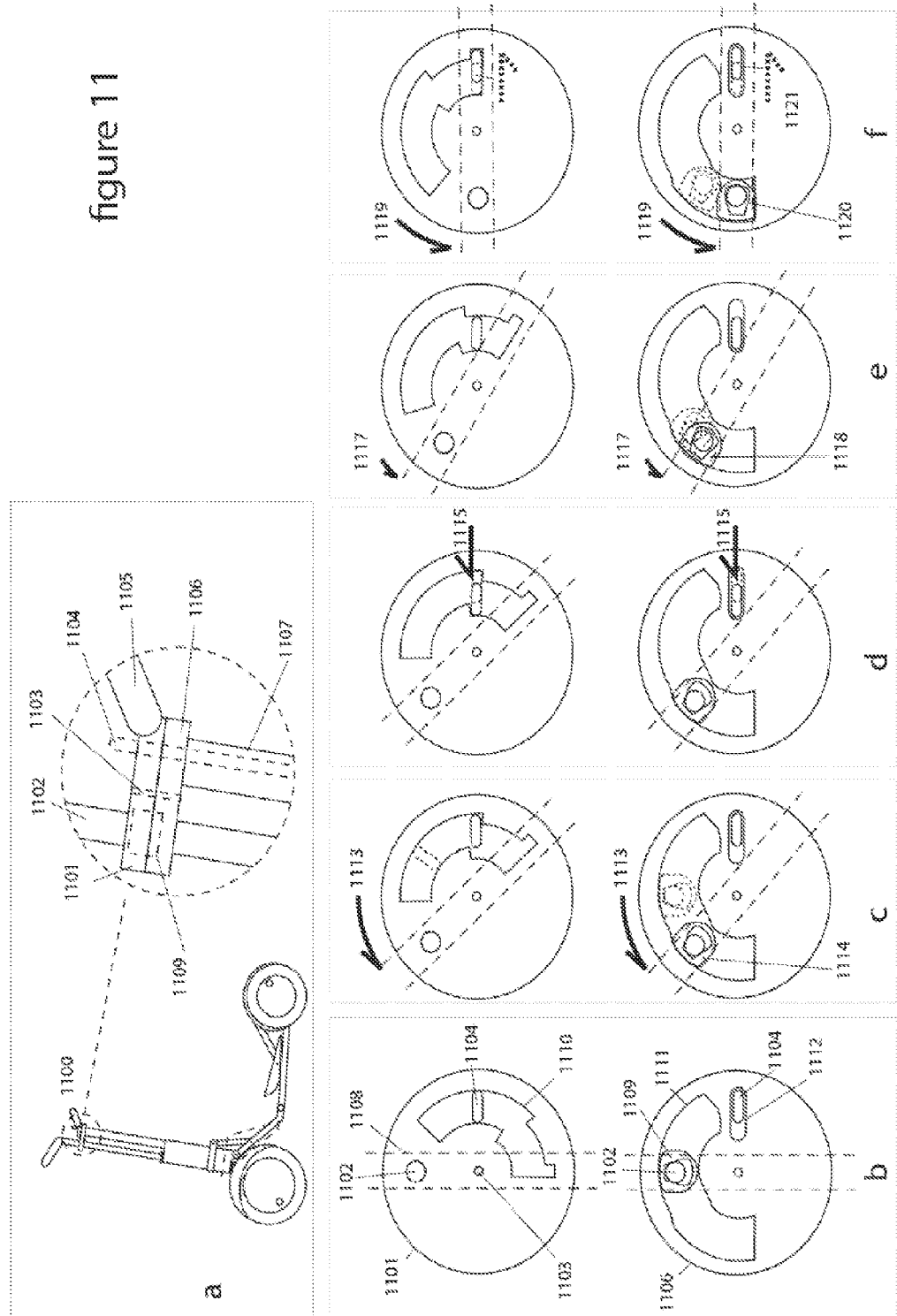

FIG. 11a, schematically illustrates a close up of top steering post assembly 1100 in a side view. A steering angle lock matrix plate 1101 is rotably connected to a steering post height lock matrix plate 1106 through a steering post assembly hinge 1103. The steering post height lock matrix plate 1106 is rigidly mounted on top of a compartment post 1107 as is a compartment handle 1105. A steering post 1102 is inserted in a corresponding profile in the steering angle lock matrix plate 1101, a height lock part 1109 is mounted in a steering post height lock profile 1111 and on the steering post 1102 locking said steering post in height. A fold-lock handle 1104 is inserted in a steering angle lock profile 1110 and in a fold lock handle profile 1112.

Further FIG. 11*b* illustrates a top view of the steering angle lock matrix plate 1101 and the steering post height lock matrix plate 1106 side by side. Steering handle is in normal position.

Followed by FIG. 11*c* where a first rotational movement 1113 is applied to the steering handle 1108 and the steering angle lock matrix plate 1101. Further movement in a same direction is hindered by the fold-lock handle 1104 and the steering angle lock profile. The height lock part 1109 is moved to a second height lock part position 1114 in correspondence to the steering post 1102 movement and the steering post height lock profile 1111.

Thereafter in FIG. 11*d* the fold lock handle 1104 is moved forward by a first forward pressing movement 1115, thereby the steering handle 1102 can be turned further counter clockwise.

In the following FIG. 11*e* a second rotational movement 1117 is applied to the steering handle 1108. The height lock part 1109 is moved correspondingly to a third height lock part position 1118 that unlocks the steering post to be adjusted in height 1102. The steering post 1102 is lifted to a top position.

Finally, as illustrated in FIG. 11*f*, the steering post 1102 is lifted to a top position and a third rotational movement 1119 is applied to the steering handle 1108. The steering post becomes locked in height position. A first backwards automatic movement 1121 moves the fold-lock handle backwards and locks the steering angle lock matrix plate 1101.

Figure 12:
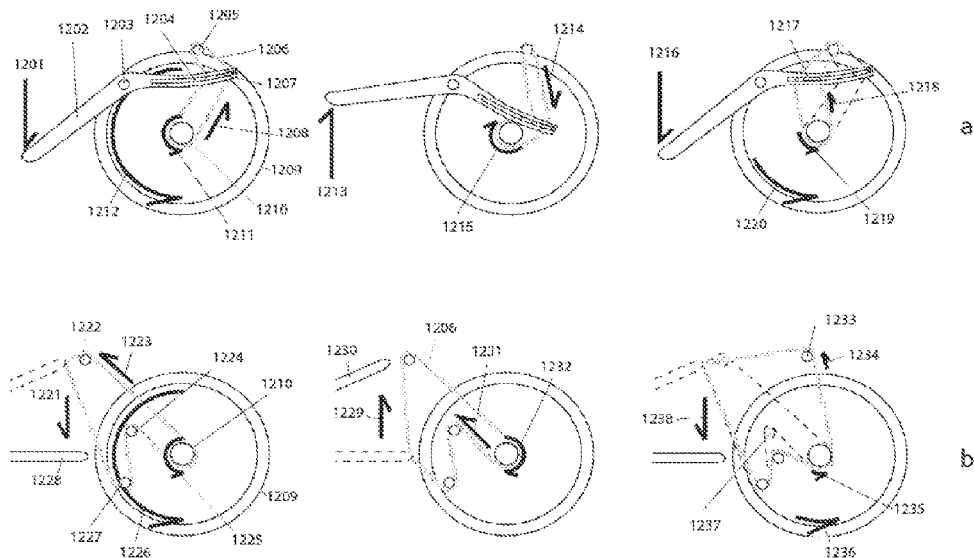

FIGS. 12*a* and 12*b* schematically illustrates embodiments of two variants of transmission and gearing mechanism compromising a pedal arm 1202 or an integrated pedal 1228, a pedal arm joint 1203 a chain strain mechanism 1204 and 1224, *a*, a chain 1206, a moveable chain fastening point 1207 and a first chain wheel 1205 or a fixed fastening point 1239 and a moveable chain gear wheel 1240, a driving wheel 1209, a freewheel 1210.

FIG. 12*a* schematically illustrates an embodiment of a transmission variant employing a pedal arm 1202 and a moveable chain fastening point 1297. The chain 1206 is connected in a loop over a free wheel 1210, a first chain wheel 1205, and a chain strain mechanism 1217 to its moveable fastening point 1207.

A first pedal downward pressure 1201, is applied to the pedal arm 1202, said pedal arm turns around the pedal arm joint 1203. A chain 1206 having a fastening point 1207 on the pedal arm 1202 is brought to a first chain movement 1208 incurring a first freewheel movement 1211 on the freewheel 1210 and a corresponding first driving wheel movement 1212. A chain strain mechanism 1204 keeps said chain suitably strained at all times. Said chain is mounted in a loop with both ends fastened in the chain fastening point 1207, and the chain running over a first chain wheel.

A pedal lift movement 1213 is applied to the pedal arm 1202, resulting in a second chain movement 1214, a second freewheel movement 1215. The freewheel 1210 does not deliver a rotational force to the driving wheel 1209 in this direction, The chain fastening point is moved to a second position of chain fastening point 1217 implementing a different gearing ratio between pedal arm 1202 movement and driving wheel movement. A second pedal downward pressure 1216 is applied to the pedal arm 1202 resulting in a third chain movement 1218, a third freewheel movement 1219, and second driving wheel movement 1220 being substantially smaller than the first driving wheel movement 1212 for matching pedal arm movement.

FIG. 12*b* schematically illustrates an embodiment of a transmission variant employing an integrated pedal 1228, a fixed chain fastening point 1239 and a moveable chain gear wheel 1240. The chain 1206 is connected in a loop over moveable gearing wheel 1240, freewheel 1210, chain strain mechanism and a second chain gear wheel to its fixed fastening point 1239.

A first integrated pedal down movement 1221, results in a first chain movement 1223 over a chain gear wheel in high gear position 1222, a first freewheel movement 1225, and a first driving wheel movement 1226.

An integrated pedal lift movement 1229, lifts the integrated pedal 1228 to an integrated pedal top position 1230, and causes a second chain movement 1231, a second freewheel movement 1232 without incurring a driving wheel movement.

The moveable chain gear wheel 1240 is moved to a low gear position 1233. When a second integrated pedal down movement 1238 is applied to the chain 1206 rolling over the first chain gear wheel in low gear position 1233 it results in a third chain movement 1234, a third freewheel movement 1235, a second driving wheel movement 1236 being substantially smaller than the first driving wheel movement 1226 for a matching integrated pedal movement.

Figure 13:
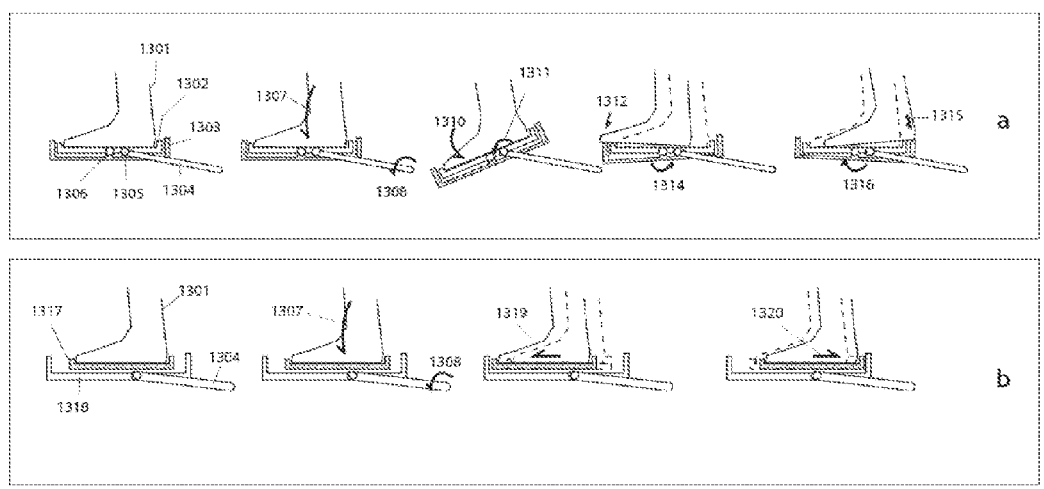

FIGS. 13*a* and 13*b* schematically illustrates embodiments of two variants of user interface mechanisms compromising a pedal part 1302, a function change part 1303, a function change joint 1306, an outer pedal part 1318, a function slide part 1317, a pedal arm 1304, a pedal joint 1305. The user interface mechanisms can be utilised to achieve different functions through a designated movement such as changing functions, activate the brakes etc.

In FIG. 13*a* a drivers foot 1301 is placed on a pedal part 1302 which is hinged in a pedal joint 1305. A function change part 1303 is via a function change joint 1306 rotably connected to said pedal.

An even push movement 1307 on the pedal 1302 results in a pedal arm rotational movement 1308. A front push movement 1310 results in a pedal forward rotational movement 1311. A function part front push 1312 results in a function part first rotational movement 1314. The function part first rotational movement 1314 is transformed to a mechanism in order to achieve a first designated function.

A function part rear push 1315, cause a function part second rotational movement 1316. The function part second rotational movement 1316 is transformed to a mechanism in order to achieve a second designated function.

In FIG. 13*b*, a drivers foot 1301 is placed on a function slide part 1317 which is inserted in an outer pedal part 1318 in such a way that it is possible to slide in a limited way in a direction parallel to the outer pedal part longitudinal axis by applying a corresponding force. The outer pedal part is rotably connected to a pedal arm 1304 through a pedal joint 1305.

An even push movement 1307 on the function slide part 1317 results in a pedal arm rotational movement 1308.

A first function forward movement 1319 moves the function slide part 1317 forward relative to the outer pedal part

1318. The first function forward movement 1319 is transformed to a mechanism in order to achieve a first designated function.

A second function backward movement 1320 moves the function slide part 1317 backwards relative to the outer pedal part 1318. The second function backward movement 1320 is transformed to a mechanism in order to achieve a designated second function.

For the described functionality such as gear change function and or brake activation function numerous conventional gear change or braking activation mechanism can be used, located on pedals, pedal arm assemblies or steering handle etc. and the gear change input force or brake activation can be distributed to the gear mechanism or brake mechanism by any means such as for example wire, electro mechanical means, hydraulic means etc.

FIG. 14 schematically illustrates a preferred embodiment of a foldable vehicle compromising a front frame assembly 1499 consisting of among other parts a front frame steering part and with a curved elongated slot 1480, a steering handle 1421 a steering post 1420,—a front wheel 1443, a left 1460 and a right 1461 wheel arm assembly compromising among other part a left 1438 and right 1411 rear wheel, a cambering joint 1430, wheel arm/front frame assembly joint 147, a fold lock handle 1499, and a left 1431 and right 1415 pedals.

The steering handle 1421 is connected to the front wheel 1443 through a steering post 1420 constituting a steering assembly. The steering assembly is connected to the front frame assembly 1499 in the latter assembly's front frame steering part 1482. The front frame steering part is rotably mounted in relation to the rest of the front frame assembly in a way that the user can turn the steering assembly in order to navigate the vehicle.

The wheel arm assemblies 1460 and 1461 are rotably connected to the fort frame assembly 1420 in the wheel arm/front frame assembly joint allowing the wheel arm assemblies to rotate in a longitudinal direction. The wheel arm assemblies 1460 and 1461 are connected to the front frame assembly 1420 by a second means, the cambering joint 1423 which limits the wheel arm assemblies 1460 and 1461 rotation in a designated way such that the vehicle can lean in curves while maintaining the main angle between the steering post 1420 and a theoretical line in between the wheel arm assemblies in a defined manner.

The wheel arm assemblies 1460 and 1461 are each equipped with a respective pedal 1431 and 1415, which are connected by a transmission to each rear wheel 1438 and 1411. The pedals 1431 and 1415 are rotably connected to each wheel arm assembly allowing them to rotate in a longitudinal direction—and thus creating a lever mechanism to be operated by a user who in an ergonomic way can deliver motion energy to the wheels 1438 and 1411 and propel the vehicle forward.

The vehicle is can be folded by turning the steering handle 1421 to a designated angle or angle span and release the fold lock handle 1423 by pushing it backwards. The fold lock mechanism is now open.

In another design either of above described unlocking mechanism, e.g. turning of steering handle 1421 and releasing fold lock handle 1423, each of these actions can alone unlock the fold lock mechanism.

When the fold lock mechanism is opened the front frame assembly 1499 can now be moved in an upward direction towards the steering handle 1421, and the wheel arm assemblies 1460 and 1461 can rotate in an angle span defined by the curved elongated slot 1480 and the now released wheel arm/front frame assembly joint 1447. By moving the front frame assembly 1499 upwards along the steering post 1420, the vehicle folds together. When the wheel arm assemblies 1460 and 1462 reach a dedicated folded position the wheel arm/front frame assembly joint is positioned in a specified position in the curved elongated slot 1480 and are automatically fixed in said position.

A

In another design of folding lock and unlock mechanism (not illustrated in drawings) the wheel arm assemblies 1460 and 1461 are made possible to rotate around a fastening point in the front frame assembly 1499 by simply releasing the wheel arm front frame assembly joint 1447 from its fixed position by for instance removing the rod part connecting the said wheel arm assemblies and said front frame assembly, thus the wheel arm assemblies can be rotated around a point fixed to the front frame assembly such as the cambering joint 1430. When the wheel arm assemblies 1460 an 1461 are moved to a folded position said rod part is inserted, connecting said wheel arm assemblies and the front frame assembly 1499 and locking the structure in a folded position.

In another design (not illustrated in drawings) of a folding lock and unlock mechanism the said rod part that connects the wheel arm assemblies to the front frame assembly 1423 with a tension mechanism such as a quick release mechanism seen on bicycle wheels. When the tension mechanism is closed the wheel arm/front frame assembly joint 1447 is secured to the front frame assembly 1423 by mechanical contact and friction. By opening the tension mechanism the wheel arm/front frame assembly joint 1447 opens in relation to the front frame assembly 1423 in such a way that they are no longer fixed in position in regards to said front frame assembly 1423, and thus can be rotated around a point fixed to the front frame assembly such as the cambering joint 1430 to a folded position, where the tension means again can be locked and secure the wheel assemblies 1460 and 1461 in a folded position.

It is understood that the solutions above can be inversely applied to the cambering joint 1430 instead of the wheel arm front frame assembly joint 1447 as described.

The steering handle 1421 is now turned further to a position opposite of the normal front facing direction, in such a manner all wheels 1443, 1438, 1411 of the vehicle is now aligned and positioned in one end of the vehicle opposite to the steering handle 1421 as shown in FIG. 14c. The vehicle is now folded in a compact manner and can be transported as a trolley rolling on the wheels.

Further the structure is formed in such a way that a bag or a carrier for goods (nor shown in drawings) can be placed in the cavity between the front frame assembly 1499 and the wheels 1443, 1438, 1411 and pedal assemblies 1431 and 1415.

The structure can compromise a compartment and or shield (not shown in drawings) which when unfolded both protects the user from dirt and liquids from other vehicles or form the ground, and can include storage room for goods. When folded, said shield and or compartment encloses the folded structure in such a way that all potentially dirty or protruding parts are covered and not is able to harm the user or other people.

FIG. 15a schematically illustrates a preferred embodiment of a foldable vehicle compromising a front frame assembly 1599a consisting of among other parts a first frame part 1585a, a first frame joint 1586a, a second frame part 1587a, a second frame joint 1588a, and a third frame part 1589a, further a steering handle 1521a a steering post 1520a,—a front wheel 1543a, a left 1560a and a right 1561a wheel arm assembly compromising among other part a left 1538a and right 1511a rear wheel, a cambering joint 1430a, a fold lock handle 1599a.

The front frame assembly 1599a is constructed from multiple parts. When folding the fold locked handle 1523a is moved in a first direction to unlock the folding mechanism that is locking a first, second and third frame part 1585a, 1587a, 1589a into a rigid body. The front frame assembly is now unlocked and no longer one rigid body but a series of rotably connected parts.

By moving the fold lock handle 1523a towards said steering handle a second frame part 1587a is rotated around a first frame joint 1586a with the rear end of said part moving upwards, a third frame part 1589a rotates in an corresponding opposite direction around a second frame joint 1588a.

When the fold lock handle 1523a is lifted to a top position, the vehicle is folded in a compact manner with all wheels 1543a, 1538a, 1511a located in a downward position opposite of the steering handle 1521a, letting the user transport the folded structure as a trolley, rolling on at least two of said wheels.

FIG. 15 b schematically illustrates a preferred embodiment of a foldable vehicle compromising a front frame assembly 1599b consisting of among other parts a first frame part 1585b, a first frame joint 1586b, a second frame part 1587b, a second frame joint 1588b, a third frame part 1589b, a folding arm 1529b and a folding bracket 1527b, further a steering handle 1521b a steering post 1520b,—a front wheel 1543b, a left 1560b and a right 1561b wheel arm assembly compromising among other part a left 1438b and right 1411b rear wheel, a cambering joint 1430b, a fold lock handle 1523b.

The front frame assembly 1599a is constructed from multiple parts. When folding the fold locked handle 1523a is moved in a first direction to unlock the folding mechanism that is locking a first, second and third frame part 1585a, 1587a, 1589a into a rigid body. The front frame assembly is now unlocked and no longer one rigid body but a series of rotably connected parts.

By moving the fold lock handle 1523a towards said steering handle, the folding arm 1529b and folding bracket 1527b moves upward in a along the steering post 1520b and causing the second frame part 1587a to rotated around a first frame joint 1586a with the rear end of said part moving upwards, a third frame part 1589a rotates in an corresponding opposite direction around a second frame joint 1588a.

When the fold lock handle 1523a is lifted to a top position, the vehicle is folded in a compact manner with all wheels 1543a, 1538a, 1511a located in a downward position opposite of the steering handle 1521a, letting the user transport the folded structure as a trolley, rolling on at least two of said wheels.

Relating to the designs illustrated in 15a and b the steering wheel 1543a is turned 180 degrees backward when folded to form an even more compact structure in a design variant.

Relating to the designs illustrated in 15a and b one further design solution is that the fold lock mechanism also requires the steering handle 1521a to be turned to a certain angle or angle span.

Relating to the designs illustrated in 15a and b one further design solution implements a front frame part made of essentially at least one component with built in joints and that can fold and unfold as described above.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

The invention can be implemented by means of mechanical hardware comprising several distinct elements, and by means of fewer suitably multifunctional components. In the device claim enumerating several means, several of these means can be embodied by one and the same component. The mere fact that certain measures are recited in mutually different dependent claims does not indicate that a combination of these measures cannot be used to advantage.

The invention claimed is:

1. A foldable vehicle comprising:
    at least three wheels, of which at least one wheel is a front wheel,
    a steering handle connected to the front wheel through a steering column assembly,
    a front frame assembly connected with the steering column assembly
    at least two wheel arm assemblies, rotably connected to the front frame assembly, and
    at least one standing surface,
    wherein at least a portion of the front frame assembly is able to move along the steering column assembly in order to fold and unfold the vehicle so that, in the folded position, the rear wheels are moved and statically fitted in a compact manner together with the front wheel so that all wheels are located in the same end of the structure.

2. The foldable vehicle according to claim 1, that folds in such a way that the folded structure can be moved rolling on the rear wheels making it easy to transport while folded.

3. The foldable vehicle according to claim 1, wherein the steering handle is located in an opposite end of the folded vehicle than the rear wheels, so that the structure functions as a trolley, the steering handle acts as handle for the user, and the rear wheels acts as trolley wheels allowing the vehicle to roll on the same.

4. The foldable vehicle according to claim 1, wherein a front frame assembly is rotably connected to the steering post in an axis substantially in line with the same allowing the steering wheel to be turned by a user in order to navigate the vehicle, further at least a portion of the front frame assembly is moveable in a direction towards the steering handle by active manipulation of the user, and causing the vehicle to fold.

5. The foldable vehicle according to claim 1, wherein the whole front frame assembly can be moved along an axis in line with the steering post in order to fold and unfold the vehicle.

6. The foldable vehicle according to claim 1, further comprising a dedicated locking mechanism and where at least a portion of the front frame assembly is released and allowed to move in relation to the steering handle by releasing the dedicated locking mechanism.

7. The foldable vehicle according to claim 1, that can be folded after unlocking the folding mechanism by turning the steering handle to a specific angle or angle span.

8. The foldable vehicle according to claim 1, wherein a compartment is mounted on the front part of said vehicle, said compartment having at least one open side wherein at least a part of the folded vehicle structure can fit.

9. The foldable vehicle according to claim 1, wherein at least two wheel arm assemblies are connected to the front frame assembly in such a way that the vehicle can lean while all wheels are connected to the ground and being substantially in line with each other.

10. The foldable vehicle according to claim 1, wherein the wheel arm assemblies are connected with a cambering joint to the front frame assembly.

11. The foldable vehicle according to claim 1, wherein at least one wheel arm assembly is equipped with a pedal and a corresponding transmission system, said pedal can be operated by the user in order to propel the vehicle forward.

12. The foldable vehicle according to claim 1, wherein each wheel arm assembly is equipped with an independent pedal and corresponding transmission system.

13. The foldable vehicle according to claim 1, wherein the wheels, in the folded position, are aligned.

* * * * *